United States Patent [19]
Kirilloff

[11] 3,895,264
[45] July 15, 1975

[54] GROUND CONNECTION MONITORING APPARATUS FOR MOBILE MACHINES

[75] Inventor: Victor V. Kirilloff, Murrysville, Pa.

[73] Assignee: Mosebach Manufacturing Company, Pittsburgh, Pa.

[22] Filed: Jan. 8, 1974

[21] Appl. No.: 431,774

Related U.S. Application Data

[63] Continuation-in-part of Ser. No. 366,761, June 4, 1973, abandoned.

[52] U.S. Cl. ......... 317/18 C; 317/18 B; 317/33 SC; 317/52; 324/51
[51] Int. Cl. ...... H02h 3/08; H02h 3/24; H02h 3/28
[58] Field of Search.. 317/18 C, 18 D, 18 R, 33 SC, 317/52; 324/51; 340/248 N, 253 B

[56] References Cited
UNITED STATES PATENTS

| | | | |
|---|---|---|---|
| 2,157,886 | 5/1939 | Cuttino | 317/18 D |
| 3,335,324 | 8/1967 | Buckeridge | 317/18 C |
| 3,522,479 | 8/1970 | Parker | 317/18 D |
| 3,697,809 | 10/1972 | Self | 317/18 C |
| 3,771,020 | 11/1973 | Smith | 317/18 C |

Primary Examiner—J. D. Miller
Assistant Examiner—Patrick R. Salce
Attorney, Agent, or Firm—Buell, Blenko & Ziesenheim

[57] ABSTRACT

Apparatus protected against ground faults for monitoring the ground connection between a grounded power source and a mobile machine provided with multi-phase power through a multi-conductor trailing cable has a star arrangement of impedances connected to the phase conductors at the power source and a like arrangement connected at the machine, the junctions of which are connected to the ground conductor at each end, through a silicon-controlled rectifier device which is paralleled by a monitoring impedance. At least one impedance of one of the star arrangement of impedances is adjusted to provide a low monitoring voltage which circulates a current through the ground conductor and monitoring impedance. The voltage across the latter actuates monitoring means. The silicon-controlled rectifier is adjusted to conduct when the voltage across it rises above the monitoring level. The monitoring current may be alternating current, or direct current obtained from a rectifier in circuit with the ground conductor.

6 Claims, 3 Drawing Figures

Fig. 1

GROUND CONNECTION MONITORING APPARATUS FOR MOBILE MACHINES

This application is a continuation-in-part of my application Ser. No. 366,761 of the same title, filed June 4, 1973, now abandoned.

This invention relates to electrically driven mobile machines supplied with current through a trailing cable. It is more particularly concerned with apparatus for monitoring the ground conductor in such cables.

Many mobile machines used in restricted areas for mineral mining, earth moving and the like are economically operated by multi-phase electric motors. These machines must be supplied with current through multi-conductor cables which trail the machines and are dragged over the ground as the machine moves. It is essential to the safety of the machine operator that the machine be effectively grounded at all times, and it is conventional practice to include in the power cable a conductor which positively connects the frame of the machine to ground, usually at the station from which power is supplied. When the mobile machine is mounted on rubber and so is effectively insulated from ground, or is grounded only through some high resistance path, the ground conductor above mentioned is the only safe means for providing the necessary ground.

The trailing cable is necessarily subject to considerable wear and abuse, and safeguards must be provided against breakage of one or more of its conductors. Breakage of a power supply conductor, hereinafter called a phase conductor, is immediately signalled by the motor driving the machine, but breakage of the ground conductor is not automatically evident, is usually unobserved, and is often unobservable. If, following such a break, a phase conductor is shorted to the machine frame, the latter may become dangerous or fatal to the machine operator.

Various protective devices and circuit arrangements have heretofore been devised to monitor the ground conductor of such power cables. The simplest arrangements include an extra conductor in the cable. One end of this check conductor is connected to one end of the ground conductor and the other ends of the two are connected through a source of low voltage and a current indicating device. The principal disadvantages of this scheme are that an extra conductor is required in the cable, and that interruption of current can be caused by breakage either of the ground conductor or check conductor. Systems adapted to three-phase power supplies have been devised utilizing no extra conductor, and are exemplified in the apparatus of U.S. Pat. No. 3,522,479 titled "Protective Electrical Systems for Mobile Machines" and issued to D. F. Parker on Aug. 4, 1970, and in U.S. Pat. No. 3,697,809 titled "Ground Wire Monitoring System with Fail-Safe Power Disconnect" issued to W. R. Self on Oct. 10, 1972. The Parker apparatus, however, gives no indication at the power source of ground conductor discontinuity or of ground fault, and has no means for disconnecting the power to the machine in response to any such indication. The monitoring circuit of the Self apparatus is only indirectly protected against ground faults by components which must be insulated for high voltage.

It is an object of my invention to provide ground conductor monitoring apparatus requiring no check conductor which monitors at the power source the continuity of the ground conductor and is protected against ground faults. It is another object to provide such apparatus in which ground fault protection is obtained by a solid-state breakdown device. It is another object to provide such apparatus which does not require a transformer at either the power source or the machine. Other objects of my invention will become apparent in the description thereof which follows.

The apparatus of my invention utilizes the phantom neutral conductor of a multi-phase supply cable as the check conductor and, as monitoring supply voltage, the voltage between the junction points of star arrangements of impedances connected to the phase conductors at the power supply center and at the machine. One such arrangement is unbalanced. The monitoring current through a monitoring resistance in the ground conductor circuit is used to trigger means actuating a circuit breaker in the power supply line, and this monitoring resistance is paralleled by a solid-state breakdown device, such as a silicon-controlled rectifier, which becomes conducting when ground conductor current rises because of ground faults or other reasons.

Embodiments of my invention presently preferred by me are illustrated in the accompanying figures to which reference is now made. Apparatus suitable for three-phase alternating current power is described and illustrated but my invention is not limited to three-phase circuits.

Figure 1:
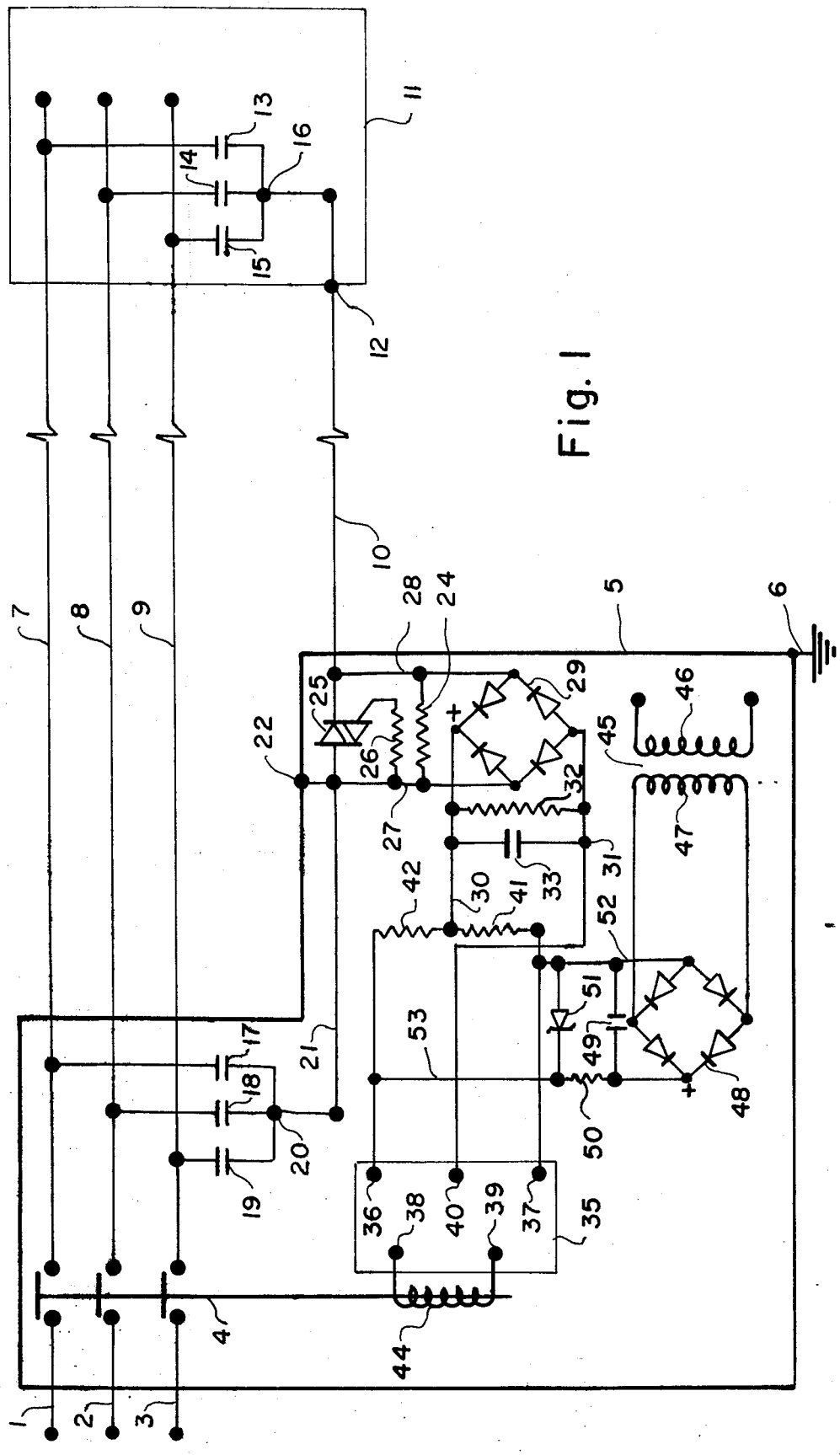
FIG. 1 is a schematic of my invention utilizing alternating monitoring current.

In FIG. 1, the three conductors 1, 2 and 3 of a three-phase power supply are brought into a power source or supply station 5. This power source 5 is contained in an enclosure which is made partially or entirely of conductive material and that material is positively earthed or grounded at one or more points 6. The three conductors previously mentioned are connected to a three-phase circuit breaker 4 mounted within power source 5. Phase conductors 7, 8 and 9, respectively, from circuit breaker 4 are lead from power source 5 as a cable which extends to enclosure 11 affixed to a mobile machine. Enclosure 11 is partially or entirely made of conductive material, and is electrically connected to the metal frame of the mobile machine. The cable containing phase conductors 7, 8 and 9 also contains a ground conductor 10. At the mobile machine ground conductor 10 is connected to the machine frame directly or through enclosure 11, as at 12. At the mobile machine phase conductors 7, 8 and 9 are connected to a motor, not shown, through appropriate control devices, also not shown.

At the mobile machine, within enclosure 11, phase conductors 7, 8 and 9 are connected to a common point 16 by a star arrangement of capacitors 13, 14 and 15, respectively, of equal value. Common point 16 is connected to the machine frame 12 through an extension of ground conductor 10.

At the power source phase conductors 7, 8 and 9 are connected to a common point 20 by a star arrangement of capacitors 17, 18 and 19, respectively. One of them, capacitor 18, for example, is of a value different from capacitors 17 and 19. Common point 20 is connected by conductor 21 to a metallic portion of power source 5 at 22.

At the power source, conductor 21 is connected to the power source end of ground conductor 10 by monitor resistor 24, through auxiliary conductors 27 and 28 at each end thereof. This resistor is shunted by a bi-directional silicon-controlled rectifier or triac 25. The trigger lead of triac 25 is connected through resistor 26 and conductor 27 to ground. One end of conductor 28 is connected to ground conductor 10. The other ends of conductors 27 and 28 are connected to the alternating current diagonal of a full-wave bridge rectifier 29. The positive lead 30 and the negative lead 31 of rectifier 29 are shunted by a bleeded resistor 32 and filter capacitor 33.

The actuating device of power source 5 is a differential amplifier 35, which is commercially available as an integrated circuit. Amplifier 35 has positive and negative direct current power supply terminals 36 and 37, respectively, output terminals 38 and 39, and one input terminal 40. The second input terminal is internally connected to a potential divider across terminals 36 and 37. An external potential divider comprising series-connected resistors 41 and 42 is likewise connected across terminals 36 and 37, resistor 42 being connected to terminal 36 and resistor 41 to terminal 37. Positive lead 30 from rectifier bridge 29 is connected to the junction point of resistors 41 and 42. Negative lead 31 from rectifier bridge 29 is connected to input terminal 40 of differential amplifier 35. The output terminals 38 and 39 of differential amplifier 35 are connected to the coil 44 of circuit breaker 4.

Power for differential amplifier 35 is supplied by transformer 45, the primary 46 of which is connected to a power source, not shown. The secondary 47 is connected to the alternating current diagonal of a bridge rectifier 48. Filter capacitor 49 is shunted across the direct current output of rectifier 48. The negative terminal of rectifier 48 is connected by conductor 52 to the junction of resistor 41 and negative terminal 37 of differential amplifier 35. the positive terminal of rectifier 48 is connected through a voltage dropping resistor 50 and conductor 53 to terminal 36 of differential amplifier 35. A Zener diode 51 is connected from negative conductor 52 to positive conductor 53.

The operation of my apparatus will be explained also with reference to the figure and the description above. Since capacitor 18 has a value different from capacitors 17 and 19, their common point 20 will not be at the same potential as common point 16 of capacitors 13, 14 and 15. Capacitor 18 is adjusted so that this potential difference is small, on the order of a few volts. This potential difference between points 16 and 20 causes an alternating current to circulate through ground conductor 10, monitoring resistor 24, and the phantom neutral of phase conductors 7, 8 and 9. Triac 25 is set so that it will not fire at such a low voltage and is non-conductive. The circulating or monitoring current therefore flows through resistor 24, which is adjusted to provide a monitoring current of a low value. Rectifier 29 rectifies the voltage across resistor 24 into a direct voltage which is applied between input terminal 40 of differential amplifier 35 and the junction point of potential divider resistors 41 and 42. The values of those resistors are adjusted so that differential amplifier 35 provides a direct current output to circuit breaker coil 44 sufficient to hold the breaker contacts closed under normal conditions, that is to say, with the normal monitoring current flowing through resistor 24.

If the ground conductor 10 should open, the monitoring current through it and resistor 24 will be interrupted and no signal voltage will be applied to input terminal 40 of differential amplifier 35. The output current of that amplifier will fall and the contacts of circuit breaker 4 will open.

If the monitoring current should increase because of a ground fault or for any other reason, the voltage across resistor 24 will rise and triac 25 will fire, short-circuiting resistor 24 and so allowing circuit breaker 4 to open. Resistor 26 is adjusted to provide the desired firing angle of triac 25. Triac 25 not only provides a direct ground connection for ground conductor 10 in such circumstances, but also prevents damage to rectifier 29 and differential amplifier 35.

The operation of transformer 45, rectifier 48 and auxiliary apparatus which supplies operating direct voltage to differential amplifier 35 is conventional and requires no description.

If desired, my apparatus may be elaborated to comprise signal means such as light, buzzer or other which is made operative by differential amplifier 35 in the way described when the ground connection 10 is interrupted. My apparatus may also be provided with an independent source of monitoring voltage, such as a small transformer, which is switched in for off-line testing of the apparatus.

It will be understood from the foregoing explanation that the potential difference causing the monitoring current to circulate is that between junction 16 at the machine and junction 20 at the power center. In the circuit previously described, that potential difference is created by unbalancing the star connected capacitors 17, 18 and 19 at the power center. The potential difference is created equally well by unbalancing the star connected capacitors 13, 14 and 15 at the machine and my invention contemplates apparatus in which this is accomplished by making one of those three capacitors of a value different from the other two. When this is done, star connected capacitors 17, 18 and 19 at the power center are conveniently made the same in value. However, the star connected capacitors both at the machine and at the power center may be unbalanced, in any way so long as the result is a circulating monitoring current.

Figure 2:
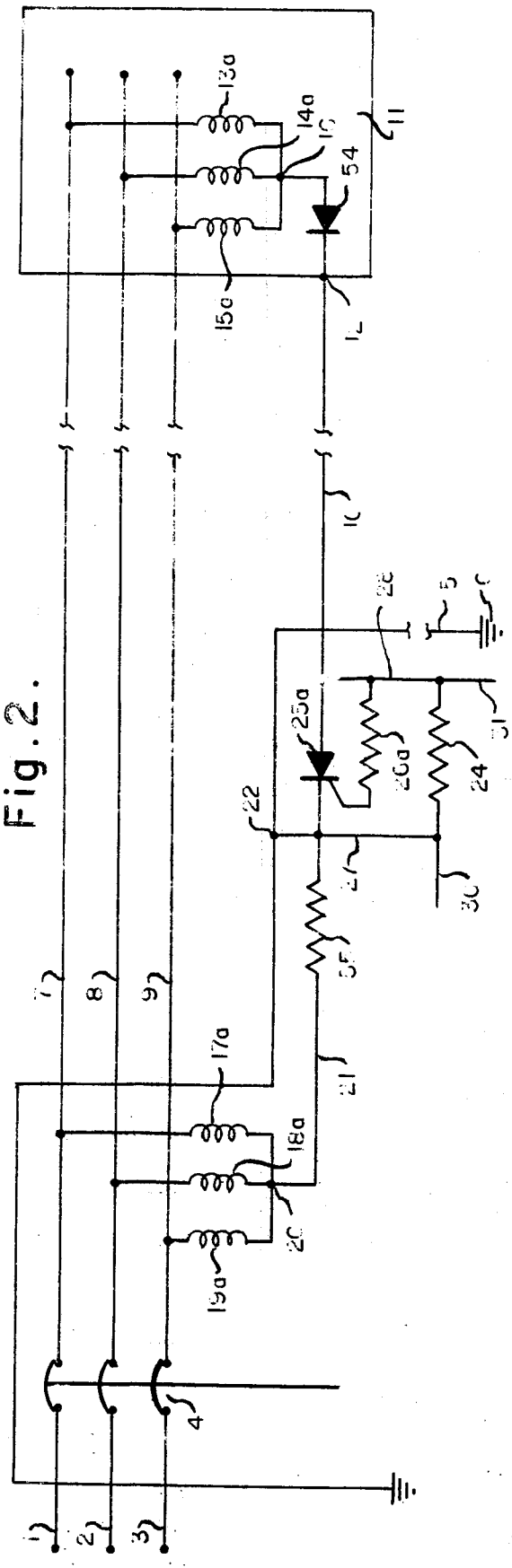
FIG. 2 is a partial schematic of my invention utilizing rectified alternating monitoring current.

FIG. 2 illustrates an embodiment of my invention utilizing rectified alternating current. A portion only of the circuit is shown as the remainder is identical with the circuit of FIG. 1. The elements of FIG. 2 which are the same as those of FIG. 1 are designated by the reference characters shown in FIG. 1.

In FIG. 2 the star-connected impedances at power source 5 are inductors rather than capacitors and are therefore marked 17a, 18a and 19a. They are connected between phase conductors 7, 8 and 9, respectively and common junction 20. The junction 20 is connected to ground at 22 by conductors 21 and 27. A current-limiting resistor 55 is optionally connected between conductors 21 and 27. In place of triac 25 of FIG. 1 is connected a silicon-controlled rectifier 25a, one terminal of which is grounded at 22 while the other is connected to ground conductor 10. The trigger lead of silicon-controlled rectifier 25a is likewise connected to ground conductor 10 through a resistor 26a. Silicon-controlled rectifier 25a ia paralleled by monitoring resistor 24, the ends of which are connected to terminal 40 of differential amplifier 35 and the junction point of voltage divider resistors 41 and 42.

At the machine 11 the star-connected impedances are likewise inductors 13a, 14a and 15a, connected between phase conductors 7, 8 and 9, respectively, and common junction 16. The latter is connected to the frame of machine 11 and ground conductor 10 by diode 54.

One of inductors 17a, 18a and 19a or of inductors 13a, 14a and 15a is made a different value from the others in its star. The alternating potential difference thus created between junctions 20 and 16 causes current to flow through rectifier 54, ground conductor 10, and monitoring resistor 24. Diode 54 rectifies this monitoring current into pulsating direct current which produces a like voltage across monitoring resistor 24. No further rectification of this voltage is required and it activates differential amplifier 35 and circuit breaker 44 connected thereto in the same way as the rectified voltage across monitoring resistor 24 in the embodiment of FIG. 1. As the monitoring current flowing through ground conductor 10 is uni-directional, the breakdown device is a conventional polarized silicon-controlled rectifier 25a rather than the bidirectional triac 25 shown in FIG. 1. Silicon-controlled rectifier 25a is adjusted so that it breaks down or conducts when the voltage across monitoring resistor 24 rises above its monitoring value, because of a ground fault or other reason.

Figure 3:
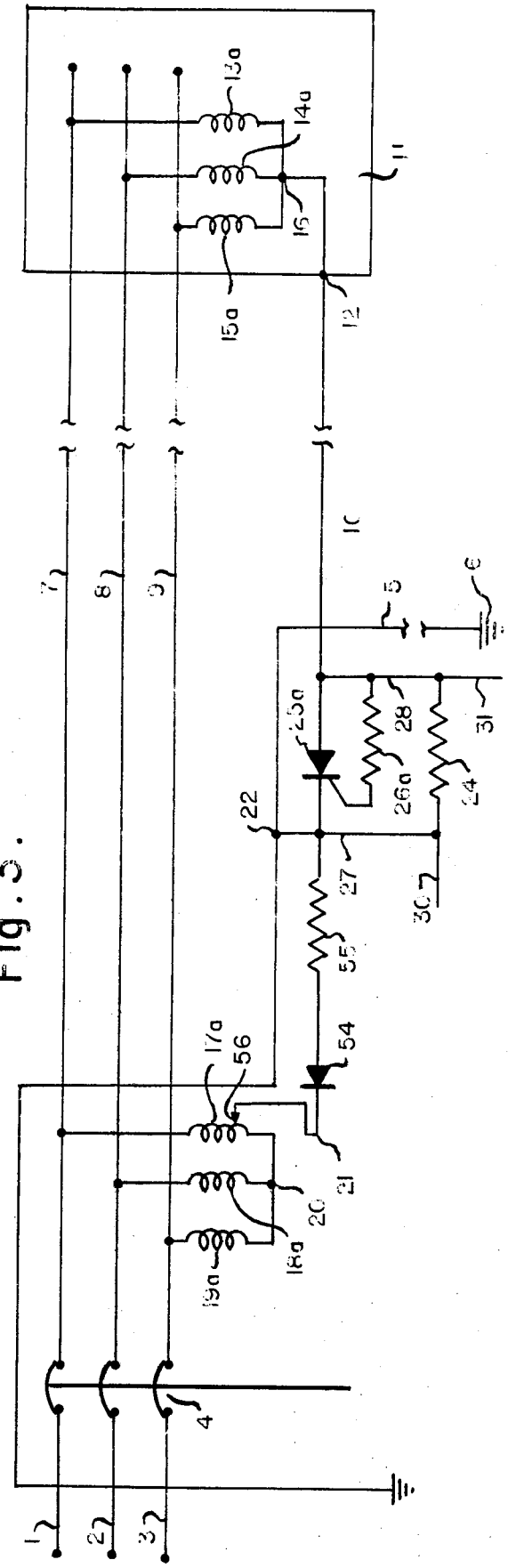
FIG. 3 is a partial schematic of another form of my invention utilizing rectified alternating monitoring current.

FIG. 3 illustrates a modification of the embodiment of my invention illustrated in FIG. 2. Inductors 17a, 18a and 19a are of the same nominal value but inductor 17a has a tap 56 near its junction end so as to provide a low monitoring voltage between that tap and junction 20. Diode 54 is connected between tap 56 and silicon-controlled rectifier 25a by conductor 21 and current-limiting resistor 55. Inductors 13a, 14a and 15a are of the same value and their junction 16 is connected to machine 11 and ground conductor 10 at terminal 12. Otherwise the circuit of FIG. 3 is the same as that of FIG. 2 which has been described. The monitoring voltage is that between tap 56 and junction 16 and the apparatus of FIG. 3 operates in the same way as that of FIG. 2.

It will be evident that the operation of the circuits of FIG. 2 and FIG. 3 will not be changed by reversal of the polarity of diode 54, as long as the polarity of silicon-controlled rectifier 25a is also reversed, as well as the connections 30 and 31 between monitoring resistor 24 and differential amplifier 35.

In the foregoing specification I have described a presently preferred embodiment of this invention, however, it will be understood that this invention can be otherwise embodied within the scope of the following claims.

I claim:

1. Apparatus for monitoring the ground connection between a mobile electrically driven machine supplied with multi-phase current through a multi-conductor trailing cable including a ground conductor attached at one end to the frame of the machine from a grounded power source, comprising a triggered solid-state breakdown device connecting the other end of the ground conductor with ground, a monitoring impedance in parallel with the triggered solid-state breakdown device, means deriving from the phase conductors a monitoring current flowing through the monitoring impedance and ground conductor, phase conductor interrupting means at the power source, and monitoring means connected across the monitoring impedance adapted to operate the phase conductor interrupting means when the current through the monitoring impedance increases above a value corresponding to the firing voltage of the triggered solid-state breakdown device.

2. Apparatus of claim 1 in which the monitoring means are adapted to operate the phase conductor interrupting means when the monitoring current falls below a predetermined value.

3. Apparatus of claim 1 in which the means for deriving a monitoring current from the phase conductors comprise an unbalanced star arrangement of capacitors connected to the phase conductors at the power source.

4. Apparatus of claim 1 in which the means deriving the monitoring current are located at the power source and provide a direct monitoring current.

5. Apparatus of claim 1 in which the monitoring means include a differential amplifier, one input of which is connected to a direct voltage proportional to the voltage across the monitoring impedance, the other input to a reference direct voltage, and the output is connected to the phase conductor interrupting means.

6. Apparatus for monitoring the ground connection between a mobile electrically driven machine supplied with multi-phase current through a multi-conductor trailing cable including a ground conductor attached at one end to the frame of the machine from a grounded power source, comprising a solid-state breakdown device connecting the other end of the ground conductor with ground, a monitoring impedance in parallel with the solid-state breakdown device, monitoring means connected across the monitoring impedance, a star arrangement of impedances connected to the phase conductors at the machine, a star arrangement of impedances connected to the phase conductors at the power source, means connecting the junctions of the star arrangement of impedances at the machine with the machine frame, means connecting the junction of the star arrangement of impedances at the power source with ground, at least one impedance of one of the star arrangements of impedances being adjusted to provide a low monitoring voltage in circuit with the ground conductor, phase conductor interrupting means at the power source, means for converting the voltage across the monitoring impedance to direct voltage, and actuating means for those interrupting means triggered by a change in current through the monitoring impedance, those actuating means comprising a differential amplifier, one input of which is connected to the said direct voltage, the other to a reference direct voltage, and the output with the interrupting means.

* * * * *